(12) United States Patent
Pannuzzo et al.

(10) Patent No.: US 10,156,174 B2
(45) Date of Patent: Dec. 18, 2018

(54) METHODS FOR MITIGATING OVER-TEMPERATURE DURING AN EXHAUST GAS SYSTEM PARTICULATE FILTER DEVICE REGENERATION

(71) Applicant: GM GLOBAL TECHNOLOGY OPERATIONS LLC, Detroit, MI (US)

(72) Inventors: Andrea Pannuzzo, Turin (IT); Adele De Domenico, Turin (IT); Andrea Dutto, Turin (IT); Francesco Siano, Turin (IT); Cristian Taibi, Turin (IT)

(*) Notice: Subject to any disclaimer, the term of this patent is extended or adjusted under 35 U.S.C. 154(b) by 68 days.

(21) Appl. No.: 15/355,459

(22) Filed: Nov. 18, 2016

(65) Prior Publication Data
US 2018/0142599 A1      May 24, 2018

(51) Int. Cl.
*F01N 9/00*      (2006.01)
*F01N 3/023*     (2006.01)
(Continued)

(52) U.S. Cl.
CPC ......... *F01N 9/002* (2013.01); *B01D 46/0027* (2013.01); *B01D 46/0057* (2013.01); *B01D 53/9431* (2013.01); *F01N 3/021* (2013.01); *F01N 3/023* (2013.01); *F01N 3/035* (2013.01); *F01N 3/0814* (2013.01); *F01N 3/2006* (2013.01); *F01N 3/2066* (2013.01); *F01N 11/002* (2013.01); *F01N 13/009* (2014.06); *F02D 41/0087* (2013.01); *F02D 41/029* (2013.01); *F02D 41/0235* (2013.01); *F02D 41/405* (2013.01); *B01D 46/006* (2013.01); *B01D 2279/30* (2013.01); *F01N 2550/04* (2013.01); *F01N 2560/06* (2013.01); *F01N 2610/03* (2013.01); *F01N 2900/1404* (2013.01); *F01N 2900/1602* (2013.01);
(Continued)

(58) Field of Classification Search
CPC .......... F01N 3/023; F01N 3/035; F01N 9/002; F01N 11/002; F01N 2430/00; F01N 2550/04; F02D 41/0087; F02D 2041/0265
See application file for complete search history.

(56) References Cited

U.S. PATENT DOCUMENTS

| 3,918,547 | A | * | 11/1975 | Kramer | ................. | B60K 11/04 |
| | | | | | | 180/68.1 |
| 5,828,297 | A | * | 10/1998 | Banks | ..................... | B60R 25/04 |
| | | | | | | 340/426.12 |

(Continued)

FOREIGN PATENT DOCUMENTS

KR      20160062356 A  *  6/2016

*Primary Examiner* — Audrey K Bradley

(57) ABSTRACT

Methods for mitigating over-temperature during an exhaust gas system particulate filter device regeneration are provided. The exhaust gas system can include an exhaust gas stream supplied by an exhaust gas source to a particulate filter device through an exhaust gas conduit. The methods can include detecting an over-temperature during a particulate filter regeneration, initiating one or more first mitigation strategies, and shutting down the exhaust gas source. The one or more first mitigation strategies can include inhibiting the particulate filter device regeneration, altering the exhaust gas source operating parameters, and activating a cooling fan. The exhaust gas source can include an internal combustion engine configured to power a vehicle, and the operating parameters can be altered by a torque limiter.

13 Claims, 2 Drawing Sheets

(51) Int. Cl.
  *F01N 3/035* (2006.01)
  *F01N 11/00* (2006.01)
  *B01D 46/00* (2006.01)
  *B01D 53/94* (2006.01)
  *F02D 41/00* (2006.01)
  *F02D 41/02* (2006.01)
  *F02D 41/40* (2006.01)
  *F01N 3/08* (2006.01)
  *F01N 3/20* (2006.01)
  *F01N 3/021* (2006.01)
  *F01N 13/00* (2010.01)

(52) U.S. Cl.
  CPC .. *F02D 2041/0265* (2013.01); *F02D 2250/18* (2013.01); *F02D 2250/26* (2013.01)

(56) References Cited

U.S. PATENT DOCUMENTS

| | | | | |
|---|---|---|---|---|
| 2003/0080730 A1* | 5/2003 | Rick | ............... | G01D 11/245 324/173 |
| 2003/0232696 A1* | 12/2003 | Shibagaki | ............ | B60W 10/06 477/76 |
| 2009/0012694 A1* | 1/2009 | Darr | ............... | F01N 3/021 701/102 |
| 2013/0195741 A1* | 8/2013 | Deeba | ............... | B01D 53/944 423/213.2 |

* cited by examiner

METHODS FOR MITIGATING OVER-TEMPERATURE DURING AN EXHAUST GAS SYSTEM PARTICULATE FILTER DEVICE REGENERATION

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur ($SO_x$), as well as condensed phase materials (liquids and solids) that constitute particulate matter. Liquids can include water and hydrocarbons, for example.

Exhaust gas treatment systems may employ filter and catalyst devices configured for accomplishing an aftertreatment process such as reducing $NO_x$ to produce more tolerable exhaust constituents of nitrogen ($N_2$) and water ($H_2O$), or trapping particulate matter. Over time, filter devices accumulate particulate matter and must be regenerated. Filter regeneration often includes high temperature soot burning, which can be accomplished by a number of methods. All such methods impart substantial thermal energy to the exhaust gas system, and surrounding components. Engine control systems can sometimes fail to accurately diagnose excessive thermal energy, which can lead to damage to or destruction of exhaust gas treatment system components and other surrounding components.

SUMMARY

According to an aspect of an exemplary embodiment, a method for mitigating over-temperature during an exhaust gas system particulate filter device regeneration is provided. The exhaust gas system can include an exhaust gas stream supplied by an exhaust gas source to a particulate filter device through an exhaust gas conduit, and a gas sensor having a sampling end disposed within the exhaust gas conduit upstream from the particulate filter device. The exhaust gas system can include an exhaust gas stream supplied by an exhaust gas source to a particulate filter device through an exhaust gas conduit. The methods can include detecting an over-temperature during a particulate filter regeneration, initiating one or more first mitigation strategies, and shutting down the exhaust gas source. The one or more first mitigation strategies can include inhibiting the particulate filter device regeneration, altering the exhaust gas source operating parameters, and activating a cooling fan. The exhaust gas source can include a radiator, and the cooling fan can be located proximate the radiator.

The particulate filter device regeneration can comprise raising the temperature of exhaust gas to at least 500° C. The particulate filter device can comprise a catalytic selective reduction filter device. The over-temperature can be determined based on the temperature of the particulate filter device. The over-temperature can be determined based on the temperature of a temperature-sensitive device proximate the exhaust gas system.

The exhaust gas source can include an internal combustion engine configured to power a vehicle, and the operating parameters can be altered by a torque limiter. Altering the exhaust gas source operating parameters can include uncoupling or partially uncoupling the internal combustion engine from a drivetrain of the vehicle. Altering the exhaust gas source operating parameters can include changing the operating mode by manipulating one or more combustion actuators. Altering the exhaust gas source operating parameters can include reducing the speed set point of the internal combustion engine.

The exhaust gas source can be shut down subsequent to initiating one or more first mitigation strategies. The exhaust gas source can be shut down after a delay time measured from the initiating of the one or more first mitigation strategies has expired. The delay time can be measured from the initiation of the one or more first mitigation strategies. The exhaust gas source can include an internal combustion engine configured to power a vehicle, and the internal combustion engine can be shut down by a plurality of increasing torque limitations and/or changes in operating parameters. The first of the plurality of torque limitations can be initiated while the vehicle is moving. The ICE 12 can be shut down by changing the operating mode by manipulating one or more combustion actuators. The internal combustion engine can be shut down by at least one torque limitation, wherein the torque limitation transitions the internal combustion engine between an activated mode where all cylinders are active to a deactivated mode where less than all cylinders are active.

Although many of the embodiments herein are described in relation to vehicles, the embodiments herein are generally suitable for all methods for mitigating over-temperature during particulate filter device regenerations.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to methods for managing particulate filter (PF) device regeneration management. The PF devices and related methods described herein are utilized in exhaust gas treatment systems configured to treat exhaust gas streams supplied by exhaust gas stream sources. Exhaust gas streams are generated, in some embodiments, by internal combustion engines (ICE) which can, for example, power a vehicle. Exhaust gas deposits can include particulate matter, carbonaceous soot, $NO_x$ species, exhaust gas liquids, and other species germane to exhaust gas. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

As PF devices accumulate particulate matter, such as carbonaceous soot, a regeneration is required. However, when soot loading surpasses a threshold, PF devices are commonly replaced, rather than regenerated, in order to avoid damage or destruction by over-temperature to the PF device, other exhaust gas treatment system devices, or nearby components such as anti-lock brake system (ABS) modules 4. Over-temperature can be defined as excessive thermal energy which can damage or destroy the PF device, other exhaust gas treatment system devices, or nearby components, such as components of a vehicle. The methods provided herein allow for PF devices to be regenerated, even when soot loading is high, by mitigating over-temperature effects and/or preventing over-temperature from occurring or continuing to occur.

Figure 1:
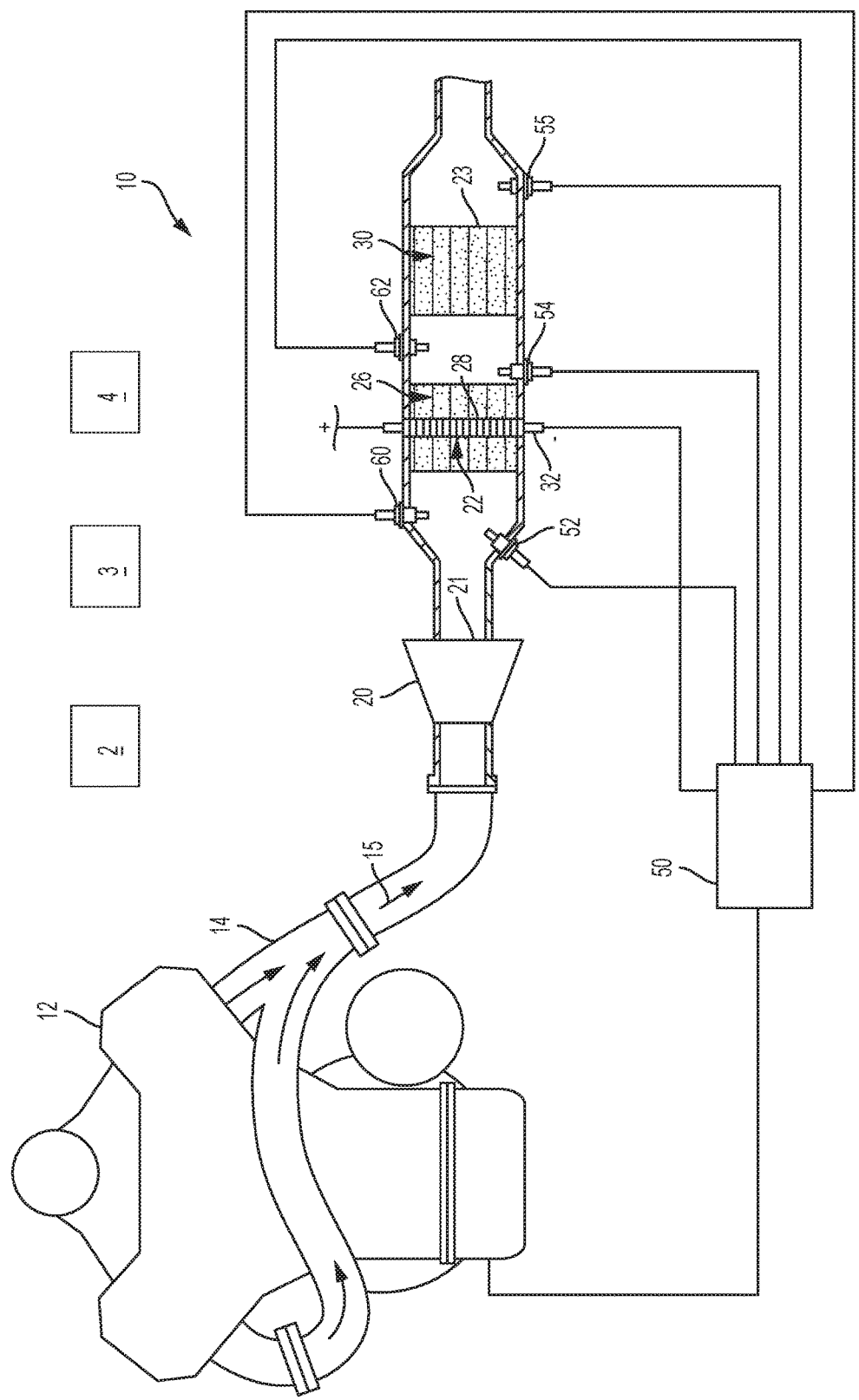
FIG. 1 illustrates an exhaust gas treatment system, according to one or more embodiments.

FIG. 1 illustrates an exhaust gas treatment system 10 for treating and/or monitoring the exhaust gas 15 constituents of an ICE 12. The methods disclosed herein will be described in relation to system 10 for the purpose of illustration only, and it should be understood that such illustration is non-limiting. The exhaust gas treatment system 10 described herein can be implemented in various ICE systems that can include, but are not limited to, diesel engine systems, gasoline direct injection systems, and homogeneous charge compression ignition engine systems. The ICEs will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 12 can generally represent any device capable of generating an exhaust gas stream 15 comprising gaseous (e.g., $NO_x$, $O_2$), carbonaceous, and/or particulate matter species, and the disclosure herein should accordingly be interpreted as applicable to all such devices. It should be further understood that the embodiments disclosed herein may be applicable to treatment of effluent streams not comprising carbonaceous and/or particulate matter species, and, in such instances, ICE 12 can also generally represent any device capable of generating an effluent stream comprising such species. For Example, ICE 12 can include a plurality of reciprocating pistons (not shown) attached to a crankshaft (not shown), which may be operably attached to a driveline, such as a vehicle driveline (not shown), to deliver tractive torque to the driveline. For example, ICE 12 can be any engine configuration or application, including various vehicular applications (e.g., automotive, marine and the like), as well as various non-vehicular applications (e.g., pumps, generators and the like).

The exhaust gas treatment system 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species.

In the embodiment as illustrated, the exhaust gas treatment system 10 devices include an oxidation catalyst (OC) device 26, and a particulate filter device (PF) device 30. The implementation shown provides the PF device 30 in a common housing with the OC device 26, yet this implementation is optional and implementations providing discrete housings for the OC device 26 and PF device 30 are practicable and germane to this disclosure. System 10 can optionally include a turbocharger 20 and the OC device 26 and PF device 30 can be downstream from a turbocharger 20. The OC device 26 and PF device 30 can be close-coupled to the turbocharger. A close-coupled treatment device can be within 1 meter of the engine turbocharger outlet, for example, wherein the distance is measured based upon the linear length of exhaust gas conduit. System 10 can optionally include an electrically heated catalyst (EHC) device 22. System 10 can optionally include a lean $NO_x$ trap (LNT) in addition or as an alternative to OC device 26. In lean conditions (i.e., wherein the air to fuel ratio exceeds stoichiometric demands), a LNT operates as an oxidation catalyst for hydrocarbons and CO, and as a trap (i.e., absorber) to store $NO_x$. During LNT regeneration, rich combustion conditions (i.e., wherein the air to fuel ratio is below stoichiometric demands) are utilized to reduce the stored $NO_x$.

As can be appreciated, the exhaust gas treatment system 10 of the present disclosure can include various combinations of one or more of the exhaust treatment devices shown in FIG. 1A, and/or other exhaust treatment devices (not shown). For example, the exhaust gas treatment system 10 can optionally include a selective catalytic reduction (SCR) device (not shown), a flow-through container of absorbent particles (not shown), and combinations thereof. Exhaust gas treatment system 10 can further include a control module 50 operably connected via a number of sensors to monitor the engine 12 and/or the exhaust gas treatment system 10.

The control module 50 is operably connected to the engine 12 and/or various exhaust gas treatment system 10 components. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can further be operably connected to the optional exhaust treatment devices described above. FIG. 1 illustrates the control module 50 in communication with three temperature sensors 52, 54, and 55 located in the exhaust gas conduit 14. The first temperature sensor 52 is located upstream of the OC device 26 and PF device 30, the second temperature sensor 54 is located downstream of the OC device 26 and PF device 30, and the third temperature sensor 55 is located downstream from the PF device 30. The temperature sensors 52, 54, and 55 send electrical signals to the control module 50 that each indicate the temperature in the exhaust gas conduit 14 in specific locations. In some embodiments, temperature sensor 55 can cooperate with temperature sensor 54 in measuring an exotherm across the PF device 30. Similarly, temperature sensors 52 and 54 can cooperate in measuring an exotherm across OC device 26. Other temperature sensors can be present in various locations throughout a vehicle, for example to monitor temperatures of temperature-sensitive devices.

System 10 can optionally include two gas sensors 60 and 62 that are in fluid communication with the exhaust gas conduit 14, and the control module 50 can be in communication with gas sensors 60 and 62. Specifically, the first upstream gas sensor 60 can be located downstream of the ICE 12 and upstream of the OC device 26 and PF device 30 to detect a one or more gas species concentration levels. The second downstream gas sensor 62 can be located downstream of the OC device 26 and PF device 30 to detect one or more gas species concentration levels in the exhaust gas conduit 14 in specific locations.

The OC device 26 can include, for example, a flow-through metal or ceramic monolith substrate that can be packaged in a stainless steel shell or canister having an inlet and an outlet in fluid communication with exhaust gas conduit 14. The substrate can include an oxidation catalyst compound disposed thereon. The oxidation catalyst compound can be applied as a wash coat and can contain platinum group metals such as platinum (Pt), palladium (Pd), rhodium (Rh) or other metal oxide catalysts such as perovksites, or combination thereof. The OC device is useful in treating unburned gaseous and non-volatile unburned hydrocarbons and CO, which are oxidized to form carbon dioxide and water. In some embodiments an OC device, such as a diesel oxidation catalyst (DOC) device, can be positioned upstream of a SCR device to convert NO into $NO_2$ for preferential treatment in the SCR.

The EHC device 22 can be disposed within the OC device 26 and include a monolith 28 and an electrical heater 32. The electrical heater 32 is connected to an electrical source (not shown) for providing power thereto, and can be selectively activated to heat the monolith 28. The electrical heater 32 can operate at a range of voltages, for example from about 12 volts to about 24 volts, and over a range of powers, for example about 1 kilowatt to about 3 kilowatts. One of skill in the art will understand that other operating voltages and powers are within the scope of this disclosure. The EHC device 22 may be constructed of any suitable material that is electrically conductive such as a wound or stacked metal monolith 28. An oxidation catalyst compound (not shown) can optionally be applied to the EHC device 22 as a wash coat and may contain metals such as Pt, Pd, perovskite or other suitable oxidizing catalysts, or combination thereof. The EHC device 22 can be utilized to help devices, such as a SCR device, achieve and/or maintain a light-off or minimum operating temperature, for example.

The PF device 30 can be disposed downstream of the OC device 26, as shown, or can be disposed upstream of the SCR device 26. For example only, the PF device 30 can include a diesel particulate filter (DPF). The PF device 30 operates to filter the exhaust gas 15 of carbon, soot, and other particulates. The PF device 30 includes a filter 23. In some embodiments, the PF device 30 can be constructed using a ceramic or SiC wall flow monolith filter 23 that can be packaged in a shell or canister constructed of, for example, stainless steel, and that has an inlet and an outlet in fluid communication with exhaust gas conduit 14. It is appreciated that the ceramic or SiC wall flow monolith filter is merely exemplary in nature and that the PF device 30 can include other filter devices such as wound or packed fiber filters, open cell foams, sintered metal fibers, etc. The ceramic or SiC wall flow monolith filter 23 can have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will increase the exhaust gas 15 backpressure, such as on the IC engine 12, for example.

In some embodiments, the PF device 30 comprises a selective catalytic reduction filter (SCRF) device. A SCRF device generally incorporates the aspects of both a SCR device and a PF device into a single device. For the purpose of illustration, an SCRF device can include a PF device with a SCR catalyst composition washcoated onto some or a portion of the PF device. Generally, the SCRF catalyst composition utilizes a reductant to convert NO and $NO_2$ to harmless components. SCRF devices can accumulate particulate matter and require regeneration, and are accordingly germane to the scope of the methods described herein.

Over time, filter devices such as PF device 30 can accumulate particulate matter and must be regenerated. Accumulation of particular matter can degrade the efficiency of a PF device 30 and increase back pressure on an ICE 12, for example. Regeneration generally involves the oxidation or burning of the accumulated particulate matter in the PF device 30. For example, carbonaceous soot particulates can be oxidized during the regeneration process to produce gaseous carbon dioxide. In general, heating carbonaceous exhaust gas deposits to temperatures at least about 600° C. to about 650° C. can initiate soot burning. Soot burning can convert carbonaceous solids to gases such as carbon dioxide, for example, or effect a chemical or physical change in the soot or accumulated deposits such that the deposits disengage from the PF device. For the purposes of this disclosure, PF device regeneration comprises raising the temperature of exhaust gas 15 to at least 500° C., at least 550° C., or at least 600° C.

One or more regeneration techniques can be implemented when a PF device 30 has accumulated an amount of particulate matter beyond an acceptable threshold, for example. A threshold can be defined as an amount of soot accumulated in the PF device 30 by weight, and/or a thickness of accumulated deposits, for example. Additionally or alternatively, a threshold can be defined as a maximum pressure drop across the PF device 30, wherein an increased pressure drop evidences an increased soot loading. Additionally or alternatively, a threshold level of reductant deposit can be predetermined via theoretical or empirical soot loading models which are implemented using current process variables from the exhaust gas system.

In many instances, regeneration comprises increasing exhaust gas 15 temperature. Increasing exhaust gas 15 temperature can be achieved by a number of methods, such as adjusting engine calibration parameters to implement a post-injection strategy, adjusting engine calibration parameters to implement an after-injection strategy, implementing an auxiliary fuel injection, utilizing the EHC device 22, and combinations thereof. In general, one or multiple regeneration strategies are utilized to regenerate a PF device 30, and such strategies can be implemented and/or optimized by module 50, for example. It should be appreciated that the above regeneration techniques are merely illustrative, and are not meant to preclude the use or suitability of other additional or alternative regeneration techniques.

A post-injection strategy is a modification of a normal ICE injection strategy, by adding or replacing a fuel injection event. During the operation of an ICE, such as ICE 12, one or more pistons of the ICE perform four strokes within the one or more corresponding cylinders: an intake stroke, a compression stroke, a combustion stroke, and an exhaust stroke. During the intake stroke, the piston begins at top dead center (TDC) and ends at bottom dead center (BDC). In a gasoline engine, the cylinder intake valve achieves an open position to allow the piston to pull an air-fuel mixture into the cylinder by producing vacuum pressure into the cylinder through its downward motion. In diesel engines, however, fuel is injected between the end of the compression stroke and the beginning of the combustion stroke. The compression stroke subsequently begins at BDC and ends at TDC. With the cylinder intake (for gasoline engines) and exhaust valves are closed, the piston compresses the air-fuel mixture in preparation for ignition. During the subsequent combustion stroke, the piston is at TDC and the compressed air-fuel mixture is ignited by a spark plug (in a gasoline engine) or by the compression (diesel engines) achieved during the compression stroke. After ignition of the air-fuel mixture, the combustion forcefully returns the piston to BDC and translates mechanic work to an associated crankshaft. During the subsequent exhaust stroke, the piston returns from BDC to TDC with the exhaust valve in an open position in order to expel the spent air-fuel mixture into an exhaust gas system, such as exhaust gas treatment system 10.

A post-injection strategy comprises injecting fuel into an engine cylinder after the air-fuel mixture is introduced into the cylinder. Post-injection occurs during the combustion stroke, before the exhaust valves open during the exhaust stroke, and after the first air-fuel mixture has already combusted, or is combusting. More specifically, post-injection occurs while the piston is sufficiently near to TDC such that the post-injected fuel can substantially or completely combust within the cylinder. By introducing additional fuel into the cylinder, post-injection accordingly raises the temperature of the exhaust gas expelled from the cylinder.

Utilizing a post-injection strategy to regenerate a PF device 30 can comprise running a post-injection strategy for a duration of time. Such durations will vary depending on the exhaust gas temperature achieved by the post-injection strategy, and the amount of deposits accumulated in the PF device 30. For example, a greater level of deposits will require a greater level of post-injection implementation (e.g., duration, amount of fuel, frequency).

An after-injection strategy is a modification of a normal ICE injection strategy, by adding or replacing a fuel injection event. An after-injection strategy introduces fuel to the exhaust gas treatment system 10 such that the fuel combusts and/or reacts with a catalytic component of the system 10 and increases the temperature of the exhaust gas 15. Specifically, an after-injection strategy comprises injecting fuel into an engine cylinder after the air-fuel mixture is introduced into the cylinder. After-injection occurs during the combustion stroke and/or exhaust stroke, while the exhaust valve is open or just before the exhaust valve opens. More specifically, after-injection occurs while the piston is sufficiently far from TDC and/or after the first air-fuel mixture has already combusted such that the after-injected fuel does not combust within the cylinder. The after-injected fuel is expelled unburnt from the cylinder during the exhaust stroke and introduced to the exhaust gas system. When the after-injected fuel contacts the OC device 26, heat released during oxidation of the fuel is imparted to the exhaust gas treatment system 10 to clear the PF device 30 of some or all accumulated particulate matter.

Similarly, auxiliary injection can be used as an additional or alternative regeneration technique to after-injection strategies. In one embodiment, fuel or hydrocarbons are introduced to the exhaust gas system 10 upstream from the OC device 26, but downstream from a cylinder of ICE 12. In one embodiment, fuel or hydrocarbons are introduced to the exhaust gas system 10 directly to the OC device 26. In all embodiments, the fuel can be injected by an auxiliary fuel injector (not shown).

Figure 2:
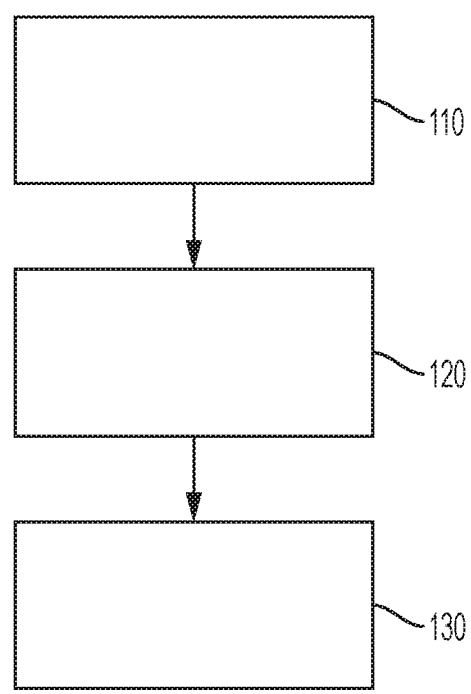
FIG. 2 illustrates a block diagram of a method for mitigating over-temperature during an exhaust gas system particulate filter device regeneration, according to one or more embodiments.

FIG. 2 illustrates a method 100 for mitigating over-temperature during an exhaust gas system PF device regeneration. The exhaust gas system generally includes an exhaust gas source that provides an exhaust gas stream to a PF device and optionally one or more exhaust gas treatment devices via an exhaust gas conduit. For the purpose of illustration only, the methods below will be described in relation to system 10, wherein the ICE 12 is used to power a vehicle. However, one or skill in the art will recognize that the methods provided herein are applicable to various exhaust gas treatment systems, including those utilized in non-vehicular applications. Method 100 comprises detecting 110 an over-temperature, initiating 120 one or more first mitigation strategies, and shutting down 130 the exhaust gas source.

An over-temperature can be detected 110 by a temperature sensor, for example a temperature sensor operatively connected to module 50, such as temperature sensor 52, 54, and/or 55. PF device 30 regeneration can comprise raising the temperature of exhaust gas 15 to at least 500° C., at least 550° C., or at least 600° C., wherein the temperature is measured at the upstream side (i.e., ICE 12 side) of PF device 30. Temperatures during PF device 30 regeneration can increase up to about 700° C., about 750° C., about 800° C., about 850° C., or about 900° C. in some instances. An over-temperature can be determined based on the temperature-sensitivity of the PF device 30, for example. Temperature-sensitivity refers to a temperature at which a component or a device is destroyed, or at least partially impaired from performing its intended purpose. An over-temperature which is determined based on the temperature-sensitivity of the PF device 30 will be specific to the PF device 30 materials of construction, geometry, the age of the device, and other factors, for example.

Because, some PF device 30 regeneration strategies increase exhaust gas 15 temperatures above the desired PF device 30 regeneration temperature in order to account for heat loss occurring upstream from the PF device 30. Such strategies can potentially damage temperature-sensitive devices, including devices not included in system 10. Accordingly, an over-temperature can be determined based on the temperature-sensitivity of one or more devices proximate system 10.

Initiating 120 one or more first mitigation strategies can include initiating 120 one first mitigation strategy, initiating 120 two first mitigation strategies, or initiating more than two first mitigation strategies. One first mitigation strategy comprises inhibiting the particulate filter device 30 regeneration. Inhibiting particulate filter device 30 regeneration can include inhibiting all particulate filter device 30 regeneration. In some embodiments where multiple regeneration strategies are utilized, inhibiting particulate filter device 30 regeneration can include inhibiting one or more regeneration strategies while continuing at least one regeneration strategy. The detected over-temperature can determine which regeneration strategies are inhibited. For example, if an EHC device 22 regeneration strategy is utilized in combination with an after-injection and/or post-injection regeneration strategy, and the over-temperature is caused by excessive thermal heat proximate the OC device 26, one or more of the EHC device 22 strategy and the after-injection strategy can be inhibited, while the post-injection strategy can be allowed to continue. In another example, if the over-temperature is caused by excessive thermal heat proximate the ICE 12, post-injection regeneration can be inhibited to reduce temperatures proximate the ICE 12 while EHC device 22 regeneration can be allowed to continue.

One first mitigation strategy comprises altering the ICE 12 operating parameters or speed set point. Altering the ICE 12 operating parameters can additionally or alternatively comprise changing the operating mode by manipulating one or more combustion actuators. Combustion actuators can include air system valves, fuel injectors, and rail pressure indicators, among others. Air system valves can include engine air intake valves, exhaust gas recirculation valves, and turbocharger valves, among others. Combustion actuators can comply with any of several modes, such as a preprogrammed mode, which are capable of effecting various engine operating objectives including reducing $NO_x$ emissions, increasing exhaust temperatures, reducing $O_2$ injection, decreasing exhaust temperatures, or increasing $O_2$ injection.

The ICE 12 speed set point (i.e., rotations per minute) can be altered by a torque limiter. A torque limiter can be utilize a torque limiter map, and can be controlled by module 50, for example. In this regard, the ICE 12 operating parameters can be altered by torque limited by imposing a maximum torque request submitted by a torque requester. A vehicle torque requester can include one or more of an accelerator pedal, power take off devices (e.g., a drive shaft), cruise control, or an internal need of the ICE 12 or specific appurtenant strategies. The maximum torque request can comprise a value defined in calibration. In one embodiment, a torque limiter or other command device can transition the ICE 12 between an activated mode where all cylinders are active to a deactivated mode where less than all cylinders are active. In one embodiment, a torque limiter or other command device can uncouple or partially uncouple the ICE 12 from the vehicle drivetrain (not shown), for example via a clutch, in order to reduce the mechanical load.

One first mitigation strategy comprises activating one or more cooling fans 2. The one or more cooling fans 2 can be powered by the ICE 12, and/or by a separate electric power source. In one embodiment, a cooling fan 2 can be located near a radiator 3 appurtenant to the ICE 12. In general, one or more cooling fans 2 can be positioned near devices which are temperature-sensitive and most prone to damage during PF device 30 regeneration.

Shutting down 130 the exhaust gas source (i.e., ICE 12) can comprise one or more of changing the operating parameters such that the exhaust gas source no longer produces additional heat, or no longer produces an exhaust gas stream 15. The exhaust gas source can be shut down in one stage, or over a plurality of torque limitations and/or changes in operating parameters. In some embodiments where ICE 12 is shut down while the vehicle is moving, shutting down ICE 12 can comprise implementing a plurality of increasing torque limitations. The ICE 12 can be shut down by changing the operating mode by manipulating one or more combustion actuators. The exhaust gas source can be shut down 130 after a delay time has expired. A delay time can be measured from the initiation of the one or more first mitigation strategies. A delay time can be determined based on experimental testing specific to the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for mitigating over-temperature during an exhaust gas system particulate filter device regeneration, wherein the exhaust gas system includes an exhaust gas stream supplied by an exhaust gas source to a particulate filter device through an exhaust gas conduit, the method comprising:
   detecting an over-temperature during a particulate filter regeneration, wherein the over-temperature comprises an excessive thermal energy which can damage a temperature-sensitive device;
   initiating a first mitigation strategy, wherein the first mitigation strategy includes activating a cooling fan; and
   shutting down the exhaust gas source, wherein shutting down the exhaust gas source occurs after a delay time, measured from the time at which the first mitigation strategy was initiated, has expired.

2. The method of claim 1, wherein the cooling fan is positioned near a temperature-sensitive exhaust gas treatment system device.

3. The method of claim 1, wherein the cooling fan is positioned near the temperature-sensitive device.

4. The method of claim 1, wherein the temperature-sensitive device comprises an anti-lock brake module.

5. The method of claim 1, wherein the exhaust gas source comprises an internal combustion engine configured to power a vehicle.

6. The method of claim 1, wherein the exhaust gas source comprises an internal combustion engine configured to power a vehicle, and particulate filter regeneration occurs while the vehicle is stationary.

7. The method of claim 1, wherein the delay time is determined based on experimental testing specific to the exhaust gas system.

8. The method of claim 1, wherein the exhaust gas source includes a radiator, and the cooling fan is located proximate the radiator.

9. The method of claim 1, wherein the exhaust gas source is shut down subsequent to the initiation of the first mitigation strategy.

10. The method of claim 1, wherein the particulate filter device comprises a catalytic selective reduction filter device.

11. The method of claim 1, wherein the exhaust gas source is shut down by at least one torque limitation, wherein the exhaust gas source comprises an internal combustion engine having a plurality of cylinders and configured to power a vehicle, and the torque limitation transitions the internal combustion engine between an activated mode where all cylinders are active to a deactivated mode where less than all cylinders are active.

12. The method of claim 11, wherein a first torque limitation of the at least one torque limitations is initiated while the vehicle is moving.

13. A method for mitigating over-temperature during an exhaust gas system particulate filter device regeneration, wherein the exhaust gas system includes an internal combustion engine having a plurality of cylinders and configured to power a vehicle which supplies an exhaust gas stream to a particulate filter device through an exhaust gas conduit, the method comprising:
   detecting an over-temperature during a particulate filter regeneration;
   initiating one or more first mitigation strategies, wherein the one or more first mitigation strategies include inhibiting the particulate filter device regeneration, altering the internal combustion engine operating parameters via a torque limiter, and activating a cooling fan; and
   shutting down the internal combustion engine subsequent to initiating one or more first mitigation strategies, wherein the internal combustion engine is shut down by a plurality of increasing torque limitations which transition the internal combustion engine between an activated mode where all cylinders are active to a deactivated mode where less than all cylinders are active.

* * * * *